(12) United States Patent
Sawai

(10) Patent No.: US 11,933,435 B2
(45) Date of Patent: Mar. 19, 2024

(54) HIGH-PRESSURE GAS TANK CONNECTION STRUCTURE

(71) Applicant: TOYOTA JIDOSHA KABUSHIKI KAISHA, Toyota (JP)

(72) Inventor: Osamu Sawai, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/959,677

(22) Filed: Oct. 4, 2022

(65) Prior Publication Data

US 2023/0116802 A1     Apr. 13, 2023

(30) Foreign Application Priority Data

Oct. 8, 2021 (JP) ................................. 2021-166465
Jan. 26, 2022 (JP) ................................. 2022-010481

(51) Int. Cl.
| | |
|---|---|
| *F16L 29/02* | (2006.01) |
| *F16L 15/00* | (2006.01) |
| *F17C 1/00* | (2006.01) |
| *F17C 13/04* | (2006.01) |

(52) U.S. Cl.
CPC ............. *F16L 29/02* (2013.01); *F16L 15/007* (2013.01); *F16L 15/008* (2013.01); *F17C 1/00* (2013.01); *F17C 13/04* (2013.01); *F17C 2201/0109* (2013.01); *F17C 2203/0604* (2013.01); *F17C 2203/0663* (2013.01); *F17C 2205/0115* (2013.01); *F17C 2205/0332* (2013.01); *F17C 2205/0382* (2013.01); *F17C 2221/012* (2013.01)

(58) Field of Classification Search
CPC ..... F16L 29/02; F17C 13/04; F17C 2203/0383; F17C 2205/0397
See application file for complete search history.

(56) References Cited

U.S. PATENT DOCUMENTS

| | | | | |
|---|---|---|---|---|
| 2,536,428 | A * | 1/1951 | Dimitri ................... | F16L 29/02 137/74 |
| 6,505,620 | B1 | 1/2003 | Goto | |
| 2005/0116190 | A1* | 6/2005 | Adams ..................... | F16K 15/18 251/368 |
| 2019/0226641 | A1* | 7/2019 | Ogiwara ................... | F17C 13/12 |

FOREIGN PATENT DOCUMENTS

| | | |
|---|---|---|
| EP | 3950536 A1 | 9/2022 |
| JP | H10-281398 A | 10/1998 |
| JP | H11-101400 A | 4/1999 |
| JP | 2000-240945 A | 9/2000 |
| JP | 2005-282764 A | 10/2005 |
| JP | 2016-148398 A | 8/2016 |
| WO | 2020-202579 A1 | 10/2020 |

* cited by examiner

*Primary Examiner* — Reinaldo Sanchez-Medina
*Assistant Examiner* — Nicole Gardner
(74) *Attorney, Agent, or Firm* — Dinsmore & Shohl LLP

(57) ABSTRACT

A high-pressure gas tank connection structure including: a tank main body; a tank side connector; a connection side connector; and a valve body, the valve body being provided further toward a deep side along the axial direction of the tank main body than the tank side connector, the valve body being urged toward the connection side connector, and, in a case in which the valve body is pushed by a distal end of the convex portion in a state in which the convex portion is joined with the concave portion, the valve body being opened from a closed state, and communicating the interior of the tank main body with the exterior to the tank main body.

6 Claims, 8 Drawing Sheets

HIGH-PRESSURE GAS TANK CONNECTION STRUCTURE

CROSS-REFERENCE TO RELATED APPLICATION

This application is based on and claims priority under 35 USC 119 from Japanese Patent Applications Nos. 2021-166465 filed on Oct. 8, 2021 and 2022-010481 filed on Jan. 26, 2022, the disclosures of which are incorporated by reference herein.

BACKGROUND

Technical Field

The present disclosure relates to a high-pressure gas tank connection structure.

Related Art

Japanese Patent Application Laid-Open (JP-A) No. 2016-148398 for example discloses a technique of connecting a valve and pipes, and supplying gas that is within a tank main body to a member that the tank is connected to. The valve has a fill path for filling a fluid into the tank main body, a removal path for taking-out the fluid that has been filled into the tank main body, and a release path for releasing the fluid that has been filled into the tank main body to the exterior at the time when there is a fire or the like and the tank main body or the periphery thereof is heated.

As described above, in this prior art technique, plural pipes for forming the paths (the flow paths) of the gas must be connected to the tank main body. As a result, in this prior art technique, the plural pipes and the valve (valve body) are provided at the outer side of the tank main body, and time and effort are required on the part of the user even when merely connecting the tank main body itself.

SUMMARY

In view of the above-described circumstances, an object of the present disclosure is to provide a high-pressure gas tank connection structure that makes it possible to easily connect a high-pressure tank to a supply member to which the high-pressure gas within the tank main body is supplied.

In order to achieve the above-described object, a high-pressure gas tank connection structure of a first aspect of the present disclosure includes: a tank main body that is formed in a tubular shape, and at which a first opening tube portion that can communicate with an exterior is formed at at least an axial direction one end portion, and at which a tubular mouthpiece is mounted to the first opening tube portion, and in whose interior a high-pressure gas is filled; a tank side connector that is tubular, is disposed on an axis of the tank main body and is mounted to the mouthpiece, and in which a concave portion, which is concave toward an inner side of the tank main body, is formed along an axial direction of the tank main body; a connection side connector connected to a supply member to which the high-pressure gas is supplied, and at which is formed a convex portion that can be joined with the concave portion, and a region between the connection side connector and the tank side connector is sealed, and the connection side connector can move along the axial direction of the tank main body with respect to the tank side connector; and a valve body provided further toward a deep side along the axial direction of the tank main body than the tank side connector, and urged toward the connection side connector, and, when the valve body is pushed by a distal end of the convex portion in a state in which the convex portion is joined with the concave portion, the valve body is opened from a closed state, and communicates an interior and an exterior of the tank main body.

The high-pressure gas tank connection structure of the first aspect of the present disclosure has the tank main body, the tank side connector, the connection side connector and the valve body. The tank main body is formed in a tubular shape, and a high-pressure gas is filled into the interior of the tank main body. The first opening tube portion that can communicate with the exterior of the tank main body is provided at at least an axial direction one end portion of the tank main body. A tubular mouthpiece is mounted to the first opening tube portion.

The tank side connector is tubular, is disposed on the axis of the tank main body, and is mounted to the mouthpiece. The concave portion, which is concave toward the inner side of the tank main body, is formed in the tank side connector along the axial direction of the tank main body.

The connection side connector is connected to a supply member to which the high-pressure gas is supplied. A convex portion, which can be joined with the concave portion formed at the tank side connector side, is formed at the connection side connector. Further, the region between the connection side connector and the tank side connector is sealed, and the connection side connector can move along the axial direction of the tank main body with respect to the tank side connector.

The valve body is provided further toward a deep side along the axial direction of the tank main body than the tank side connector, and is urged toward the connection side connector side. When the valve body is pushed by the distal end of the convex portion in a state in which the convex portion that is formed at the connection side connector is joined with the concave portion that is formed at the tank side connector, the valve body is opened from the closed state, and communicates the interior and the exterior of the tank main body.

In this way, in the present disclosure, the valve body is provided further toward the deep side along the axial direction of the tank main body than the connection side connector that is connected to the supply member to which the high-pressure gas is supplied, and the valve body is not provided at the outer side of the tank main body. Therefore, as compared with a case in which the valve body is provided at the outer side of the tank main body, the high-pressure tank can be connected easily to the supply member via the connection side connector.

Further, in the present disclosure, in the state in which the convex portion formed at the connection side connector is joined to the concave portion formed at the tank side connector, when the valve body, which is urged toward the connection side connector side, is pushed by the distal end of the convex portion against the urging force that urges the valve body toward the connection side connector side, the valve body is opened from the closed state.

To put it another way, in the state in which the convex portion formed at the connection side connector is joined to the concave portion formed in the tank side connector, if the valve body is not pushed by the distal end of the convex portion, the closed state of the valve body is maintained.

In this way, by making it possible to close the valve body in the state in which the connection side connector is joined to the tank side connector, leaking of the gas that is within the tank main body can be suppressed. Further, by opening the valve body in the state in which the connection side connector is joined to the tank side connector, the tank main body coming out of place can be suppressed.

In a high-pressure gas tank connection structure of a second aspect of the present disclosure, in the high-pressure gas tank connection structure of the first aspect, a sealing member, which contacts an inner surface of the concave portion and seals a region between the convex portion and the concave portion, is provided at an outer surface of the convex portion, and the valve body is pushed and opened by a distal end of the convex portion in a state in which the region between the convex portion and the concave portion is sealed by the sealing member.

In the high-pressure gas tank connection structure of the second aspect of the present disclosure, the sealing member is provided at the outer surface of the convex portion formed at the connection side connector. This sealing member contacts the inner surface of the concave portion formed in the tank side connector, and seals the region between the convex portion and the concave portion.

Here, the valve body is pushed and opened in the state in which the region between the convex portion formed at the connection side connector and the concave portion formed at the tank side connector is sealed by the sealing member. Due thereto, in the state in which the valve body is opened, leaking of the gas that is within the tank main body can be suppressed.

In a high-pressure gas tank connection structure of a third aspect of the present disclosure, in the high-pressure gas tank connection structure of the second aspect, an amount of movement of the connection side connector, at which a state in which the region between the connection side connector and the concave portion is sealed by the sealing member is maintained, is set to be greater than an amount of movement of the connection side connector up until the closed valve body opens, and smaller than an amount of movement of the connection side connector from after the convex portion is joined to the concave portion up until a completely joined state of being completely joined is reached.

In the high-pressure gas tank connection structure of the third aspect of the present disclosure, an amount of movement (b) of the connection side connector, at which the state in which the region between the connection side connector and the concave portion formed in the tank side connector is sealed by the sealing member is maintained, is set to be larger than an amount of movement (a) of the connection side connector up until the valve body that is closed is opened, and smaller than an amount of movement (c) of the connection side connector from after the connection side connector is joined to the tank side connector up until the completely joined state is reached (a<b<c).

Due thereto, the connection side connector is joined to the tank side connector, and the region between the connection side connector and the concave portion formed at the tank side connector is sealed by the sealing member, and thereafter, the valve body that has been closed is opened. Namely, in the present disclosure, because the valve body is opened after the region between the tank side connector and the connection side connector is sealed, leaking of the hydrogen gas at the time when the valve body is opened can be suppressed.

In a high-pressure gas tank connection structure of a fourth aspect of the present disclosure, in the high-pressure gas tank connection structure of the third aspect, at the concave portion, a lateral hole portion that communicates with an exterior passes through in a direction orthogonal to the axial direction of the tank main body at a position that is further apart from the valve body than the sealing member, and a separated distance between the lateral hole portion and the sealing member along the axial direction of the tank main body in the completely joined state of the convex portion and the concave portion is set to be greater than the amount of movement of the connection side connector up until the closed valve body opens, and smaller than the amount of movement of the connection side connector at which the state in which the region between the connection side connector and the concave portion is sealed by the sealing member is maintained.

In the high-pressure gas tank connection structure of the fourth aspect of the present disclosure, at the concave portion that is formed in the tank side connector, the lateral hole portion that communicates with the exterior passes through in the direction orthogonal to the axial direction of the tank main body at a position that is further away from the valve body than the sealing member. Namely, the interior and the exterior of the concave portion that is formed in the tank side connector are communicated through this lateral hole portion.

Here, separated distance (d) between the sealing member and the lateral hole portion along the axial direction of the tank main body in the completely joined state of the convex portion formed at the connection side connector and the concave portion formed at the tank side connector, is set to be greater than the amount of movement (a) of the connection side connector up until the closed valve body opens, and smaller than the amount of movement (b) of the connection side connector at which the state in which the region between the connection side connector and the concave portion formed in the tank side connector is sealed by the sealing member is maintained (a<d<b).

Due thereto, when the connection side connector that is completely joined to the tank side connector is moved along the axial direction of the tank main body in the direction in which the joined state is canceled, first, the distal end of the convex portion of the connection side connector moves apart from the valve body, and the valve body enters into the closed state from the opened state.

The amount of movement (a) of the connection side connector at this time is smaller than the separated distance (d) between the sealing member and the lateral hole portion along the axial direction of the tank main body. Therefore, even in the state in which the valve body is closed, the state in which the region between the outer surface of the convex portion formed at the connection side connector and the inner surface of the concave portion formed at the tank side connector is sealed by the sealing member is maintained.

When, from this state, the connection side connector is moved further along the axial direction of the tank main body in the direction in which the joined state is canceled, the sealing member passes-by the lateral hole portion. Due thereto, the high-pressure gas that stays within the concave portion flows-out through the lateral hole portion to the exterior, and the pressure at the interior of the concave portion is released.

Here, the separated distance (d) between the sealing member and the lateral hole portion is set to be smaller than the amount of movement (b) of the connection side connector at which the state in which the region between the connection side connector and the concave portion formed at the tank side connector is sealed by the sealing member is maintained.

As described above, this amount of movement (b) of the connection side connector is set to be smaller than the amount of movement (c) of the connection side connector from after the connection side connector is joined to the tank side connector up until the completely joined state is reached. Here, the amount of movement (c) of the connection side connector from after the connection side connector is joined to the tank side connector up until the completely joined state is reached is, in other words, the amount of movement of the connection side connector from the completely joined state of the connection side connector to the tank side connector up until the canceled state is reached.

Namely, the separated distance (d) between the sealing member and the lateral hole portion is smaller than the amount of movement (c) of the connection side connector from the completed joined state of the connection side connector to the tank side connector up until the canceled state is reached. Therefore, when the pressure at the interior of the concave portion is released through the lateral hole portion, there is a state in which the connection side connector is joined to the tank side connector. Accordingly, in the present disclosure, when the pressure at the interior of the concave portion is released through the lateral hole portion, the tank main body coming out of place can be suppressed.

In a high-pressure gas tank connection structure of a fifth aspect of the present disclosure, in the high-pressure gas tank connection structure of any one of the first through fourth aspects, a second opening tube portion that can communicate with an exterior is provided at an axial direction another end portion of the tank main body, and a thermally-activated pressure relief device, which releases high-pressure gas that is within the tank main body when a temperature that is greater than or equal to a predetermined temperature is sensed, is provided at the second opening tube portion.

In the high-pressure gas tank connection structure of the fifth aspect of the present disclosure, the second opening tube portion that can communicate with the exterior is provided at the axial direction another end portion of the tank main body. A thermally-activated pressure relief device is provided at the second opening tube portion. When a temperature that is greater than or equal to a predetermined temperature is sensed, high-pressure gas that is within the tank main body is released by this thermally-activated pressure relief device. Due thereto, breakage of the high-pressure tank at the time of a fire or the like can be avoided.

In this way, in the high-pressure tank of the present disclosure, a thermally-activated pressure relief device is provided at the side opposite the valve body that is for supplying the high-pressure gas. Due thereto, the structure of the high-pressure tank can be made to be simple as compared with a case in which the valve body and the thermally-activated pressure relief device are provided at the axial direction one end side of the high-pressure tank.

In a high-pressure gas tank connection structure of a sixth aspect of the present disclosure, the high-pressure gas tank connection structure of the fifth aspect includes: a fixed member formed in a tubular shape and mounted to the axial direction another end portion side of the tank main body, and at which the thermally-activated pressure relief device is mounted to a concave portion that is formed along the axial direction of the tank main body so as to be concave toward an inner side of the tank main body; a communication path that, at the concave portion, passes through along a direction orthogonal to an axial direction of the fixed member from an inner surface of the concave portion over to an outer surface of the fixed member, and, when the high-pressure gas is released, the communication path communicates an interior and an exterior of the tank main body by a safety valve that is provided at the thermally-activated pressure relief device; a ring provided at the outer surface of the fixed member, and a gap is formed between the ring and the outer surface of the fixed member and can communicate with the communication path, and the ring can move along a peripheral direction with respect to the fixed member and is unable to move along an axial direction with respect to the fixed member; and a jetting port formed in the ring and passing through from an inner surface over to an outer surface of the ring, and able to communicate the communication path and the exterior through the gap.

In the high-pressure gas tank connection structure of the sixth aspect of the present disclosure, the fixed member that is tubular is mounted to the axial direction another end portion side of the tank main body. The concave portion that is concave toward the inner side of the tank main body is formed in the fixed member along the axial direction of the tank main body. The thermally-activated pressure relief device is mounted to this concave portion.

The communication path, which passes through along the direction orthogonal to the axial direction of the fixed member from the inner surface of the concave portion over to the outer surface of the fixed member, is provided at the concave portion. At the time when the high-pressure gas is released, the communication path can communicate the interior and the exterior of the tank main body by the safety valve that is provided at the thermally-activated pressure relief device.

The ring is provided at the fixed member, at the outer surface of the fixed member. A gap is formed between the ring and the outer surface of the fixed member, and can communicate with the communication path formed in the fixed member. Further, movement of the ring along the peripheral direction with respect to the fixed member is possible, and movement of the ring along the axial direction with respect to the fixed member is impossible (restricted). Moreover, the jetting port, which passes through from the inner surface over to the outer surface of the ring, is formed in the ring. The jetting port can communicate with the communication path, through the gap that is formed between the ring and the outer surface of the fixed member.

As described above, in the present disclosure, the communication path is formed at the concave portion of the fixed member, and the jetting port, which can communicate with the communication path through the gap, is formed at the ring at which the gap is formed between the ring and the outer surface of the fixed member. Due thereto, in the present disclosure, at the time when high-pressure gas is released, the high-pressure gas passes from the flow path, which is at the axially central side of the fixed member formed in a tubular shape, through the communication path, and passes through the gap, and is jetted-out from the jetting port that is formed in the ring.

Namely, in the present disclosure, due to the gap being provided between the ring and the outer surface of the fixed member, the high-pressure gas, which passes from the flow path at the axially central side of the fixed member through the communication path and is released, can pass through the gap and be jetted-out from the jetting port, even if the position of the jetting port formed in the ring and the position of the communication path formed in the fixed member do not face one another.

Here, movement of the ring along the peripheral direction with respect to the fixed member is possible. Accordingly, in the present disclosure, the position of the jetting port can be changed by rotating the ring along the peripheral direction of the fixed member, in association with the mounted position of the tank main body.

Generally, a safety valve is made integral with a jetting port that jets-out high-pressure gas, and is fixed to a high-pressure gas tank. Therefore, there are cases in which, depending on the orientation of the high-pressure gas tank, the orientation of the jetting port is different than that which is expected. In this case, the orientation of the high-pressure gas tank must be changed so as to accord with the orientation of the jetting port, and the work is bothersome.

To address this, in the present disclosure, as described above, the position of the jetting port can be changed by rotating the ring along the peripheral direction of the fixed member, in association with the mounted position of the tank main body. Therefore, there is no need to change the orientation of the high-pressure gas tank so as to accord with the orientation of the jetting port, and the workability improves.

In a high-pressure gas tank connection structure of a seventh aspect of the present disclosure, in the high-pressure gas tank connection structure of the sixth aspect, a nut, which fixes the ring to the fixed member, is provided further toward an outer side in the axial direction of the tank main body than the ring.

In the high-pressure gas tank connection structure of the seventh aspect of the present disclosure, the nut is provided further toward the outer side, in the axial direction of the tank main body, than the ring, and the ring is fixed to the fixed member by this nut. By fixing the ring to the fixed member by the nut in this way, as compared with a case in which, for example, claws are raised and the ring is fastened and fixed to the fixed member, or the ring is fixed to the fixed member by welding, the ring can be fixed to the fixed member by a simple operation, and, after the ring is fixed to the fixed member, the position of the ring can be changed.

In a high-pressure gas tank connection structure of an eighth aspect of the present disclosure, in the high-pressure gas tank connection structure of the sixth or seventh aspect, the gap is formed by an annular groove portion that is provided concavely in the inner surface of the ring.

In the high-pressure gas tank connection structure of the eighth aspect of the present disclosure, the annular groove portion is provided concavely in the inner surface of the ring, and due thereto, a gap is provided between the ring and the outer surface of the fixed member. Namely, at the ring, the both sides of the groove portion along the axial direction of the ring can abut the outer surface of the fixed member. Therefore, in the state in which the ring abuts the outer surface of the fixed member, movement of the ring along the direction orthogonal to the axial direction of the fixed member is restricted. Due thereto, positional offset of the axial center of the fixed member and the axial center of the ring can be suppressed.

In a high-pressure gas tank connection structure of a ninth aspect of the present disclosure, in the high-pressure gas tank connection structure of any one of the first through eighth aspects, a protector, which forms an air layer or a heat insulating layer between the protector and the tank main body, is provided at an outer side of the tank main body.

In the high-pressure gas tank connection structure of the ninth aspect of the present disclosure, the protector is provided at the outer side of the tank main body, and an air layer or a heat insulating layer is formed between the protector and the tank main body. Due thereto, at the high-pressure tank, a heat insulating effect and a shock absorbing effect can be obtained.

As described above, in accordance with the high-pressure gas tank connection structure of the first aspect of the present disclosure, the high-pressure tank can easily be connected to a supply member to which the high-pressure gas that is within the tank main body is supplied.

In accordance with the high-pressure gas tank connection structure of the second aspect of the present disclosure, leaking of the gas that is within the tank main body can be suppressed because the valve is opened in the state in which the region between the connection side connector and the tank side connector is sealed by the sealing member.

In accordance with the high-pressure gas tank connection structure of the third aspect of the present disclosure, leaking of hydrogen gas at the time when the valve body is opened can be suppressed.

In accordance with the high-pressure gas tank connection structure of the fourth aspect of the present disclosure, the releasing of the pressure within the concave portion through the lateral hole portion is carried out in the state in which the connection side connector is joined to the tank side connector. Therefore, the tank main body coming out of place can be suppressed.

In accordance with the high-pressure gas tank connection structure of the fifth aspect of the present disclosure, the breakage at the time of a fire or the like at the high-pressure tank can be avoided.

In accordance with the high-pressure gas tank connection structure of the sixth aspect of the present disclosure, the work of rotating the tank main body along the axial direction so as to accord with the position of the jetting port that jets-out the high-pressure gas, and mounting the tank main body and the like, is unnecessary, and the workability improves.

In accordance with the high-pressure gas tank connection structure of the seventh aspect of the present disclosure, the ring can be fixed to the fixed member by a simple operation. Further, after the ring is fixed, the position of the ring can be changed.

In accordance with the high-pressure gas tank connection structure of the eighth aspect of the present disclosure, positional offset between the axial center of the fixed member and the axial center of the ring can be suppressed.

In accordance with the high-pressure gas tank connection structure of the ninth aspect of the present disclosure, a heat insulating effect and a shock absorbing effect can be obtained at the high-pressure tank.

BRIEF DESCRIPTION OF THE DRAWINGS

Exemplary embodiments of the present disclosure will be described in detail based on the following figures, wherein.

DETAILED DESCRIPTION

A high-pressure gas tank 12, to which a high-pressure gas tank connection structure 10 relating to an embodiment of the present disclosure is applied, is described hereinafter by using the drawings. Note that, for convenience of explanation, arrow S that is shown appropriately in the respective drawings is the axial direction of the high-pressure gas tank 12 to which the high-pressure gas tank connection structure 10 is applied, and arrow R is the radial direction of the high-pressure gas tank connection structure 10.

(Structure of High-Pressure Gas Tank Connection Structure) First, the structure of the high-pressure gas tank connection structure 10 relating to the embodiment of the present disclosure is described.

Figure 1:
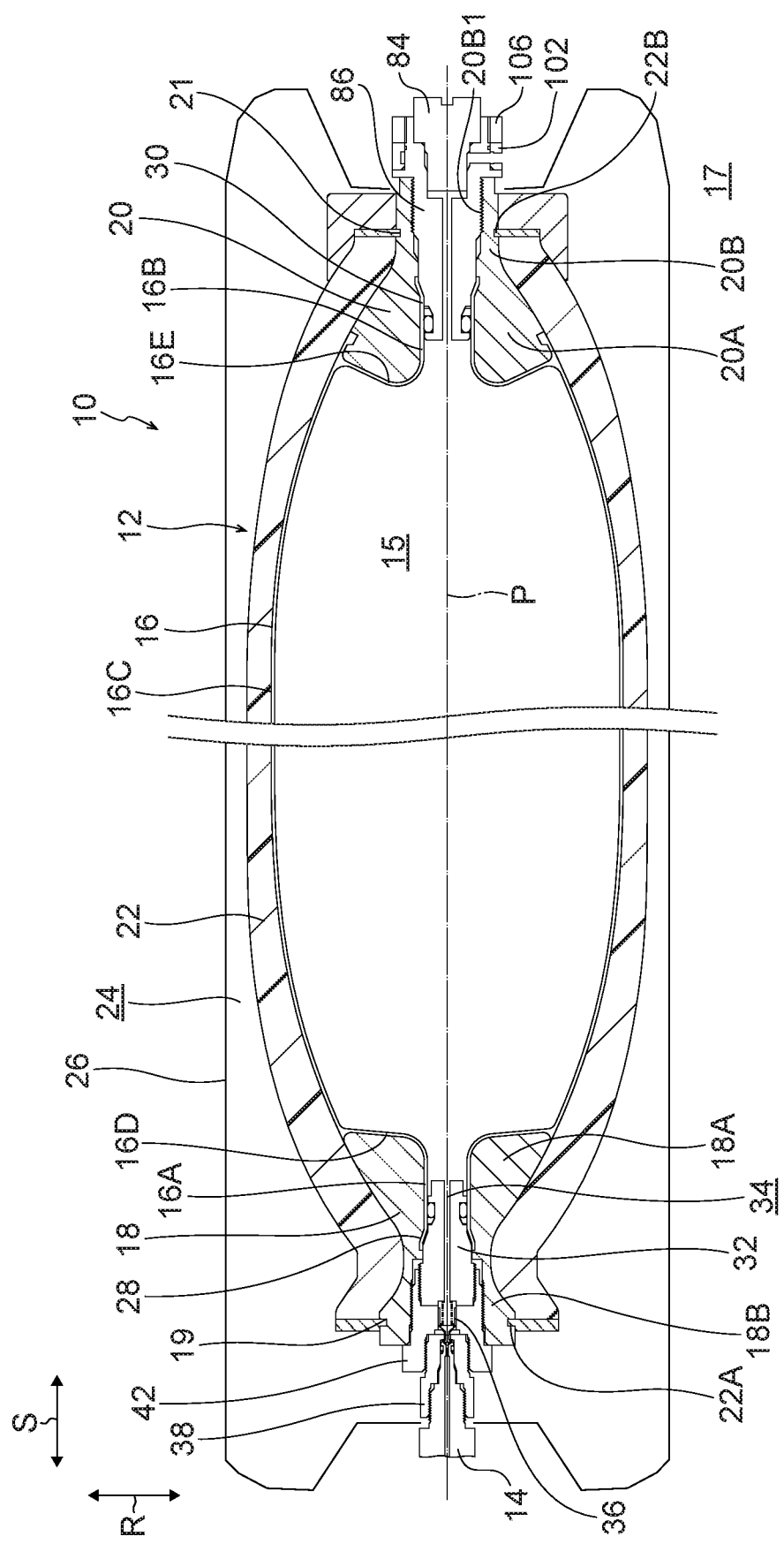
FIG. 1 is a cross-sectional view illustrating a high-pressure gas tank to which a high-pressure gas tank connection structure relating to an embodiment is applied.

The high-pressure gas tank 12 illustrated in FIG. 1 structures a portion of a tank module (not illustrated) that is installed in, for example, a fuel cell vehicle (not illustrated). Note that the tank module is structured to include the plural high-pressure gas tanks 12 that are connected to one another via a connection side connector 14 that is described later and the like.

The high-pressure gas tank 12 is structured to include a liner (tank main body) 16 that is substantially shaped as a cylindrical tube and in whose interior compressed hydrogen gas (hereinafter simply called "hydrogen gas") that is a high-pressure gas is filled, mouthpieces 18, 20 that are substantially shaped as cylindrical tubes and are mounted to axial direction both end portions 16A, 16B of the liner 16 respectively, and a reinforcing layer 22 that covers the outer peripheral surfaces of the liner 16 and the mouthpieces 18, 20 from the outer sides thereof and reinforces the liner 16. Moreover, a protector 26 is provided at the outer side of the high-pressure gas tank 12 in a state in which a gap 24 is provided between the protector 26 and the high-pressure gas tank 12. The high-pressure gas tank 12 is accommodated within the protector 26.

The liner 16 is formed so as to have a substantially uniform wall thickness, from a resin material such as a polyamide synthetic resin or the like. The outer diameter dimension of the liner 16 is substantially uniform at a trunk portion 16C that is the axial direction intermediate portion thereof, and the liner 16 is formed such that the outer diameter dimension thereof gradually becomes smaller from the trunk portion 16C toward the one end portion 16A and the another end portion 16B, respectively.

More specifically, a shoulder portion 16D, which is formed by the difference in the outer diameter dimensions of the trunk portion 16C and the one end portion 16A of the liner 16, is provided at the one end portion 16A side of the liner 16. An opening tube portion 28 that has a small diameter is provided at the one end portion 16A of the liner 16. A shoulder portion 16E, which is formed by the difference in the outer diameter dimensions of the trunk portion 16C and the another end portion 16B of the liner 16, is provided at the another end portion 16B side of the liner 16. An opening tube portion 30 that has a small diameter is provided at the another end portion 16B of the liner 16.

The mouthpiece 18 that is made of metal is provided at the outer side of the opening tube portion 28, including at the shoulder portion 16D. The mouthpiece 20 that is made of metal is provided at the outer side of the opening tube portion 30, including at the shoulder portion 16E. The mouthpieces 18, 20 are formed such that the outer diameter dimensions thereof at the trunk portion 16C sides of the liner 16, and the outer diameter dimensions thereof at the shoulder portion 16D, 16E sides of the liner 16, are substantially the same. The mouthpieces 18, 20 are set such that steps are not formed between the liner 16 and the mouthpieces 18, 20 along the axial direction of the liner 16.

Further, the reinforcing layer 22 is formed of a carbon fiber reinforced plastic (CFRP) that is an example of a fiber reinforced plastic (FRP). Here, groove portions 19, 21 are formed in the outer peripheral surfaces of the mouthpieces 18, 20 respectively. An axial direction one end portion 22A of the reinforcing layer 22 is fit into the groove portion 19, and an axial direction another end portion 22B of the reinforcing layer 22 is fit into the groove portion 21.

Due thereto, shifting of the reinforcing layer 22 along the axial direction of the liner 16 is suppressed. Further, the reinforcing layer 22 is structured such that the wall thickness thereof gradually becomes thicker from the trunk portion 16C side of the liner 16 toward the opening tube portion 28, 30 sides, respectively.

The protector 26 is formed of, for example, a glass fiber reinforced plastic (GFRP), and the gap 24 is provided between the protector 26 and the high-pressure gas tank 12. Namely, an air layer is provided within the gap 24. Note that, although not illustrated, a heat insulating material of glass fibers or the like can be filled in this gap 24. In this case, a heat insulating layer is formed in the gap 24.

Although GRFP is used as an example of the material of the protector 26 here, it suffices to be able to ensure the strength and rigidity that are needed in order to protect the high-pressure gas tank 12. Therefore, the material of the protector 26 is not limited to this, and a metal such as an aluminum alloy, stainless steel, or the like may be used. However, depending on the specifications of the high-pressure gas tank 12, the protector 26 is not absolutely necessary.

By the way, in the present embodiment, a nozzle member 32 that is substantially shaped as a cylindrical tube is attached to the inner peripheral surface of the opening tube portion 28 that is at the one end portion 16A side of the liner 16. A nozzle portion (flow path) 34 is provide at the axially central portion of the nozzle member 32. The hydrogen gas within the liner 16 can flow through the nozzle portion 34 out to the exterior.

A thermally-activated pressure relief device (TPRD) 84 is provided at the another end portion 16B side of the liner 16. When heat from a fire is sensed, the TPRD 84 releases the hydrogen gas within the high-pressure gas tank 12 in order to avoid breakage of the high-pressure gas tank 12 (as will be described later).

Figure 2:
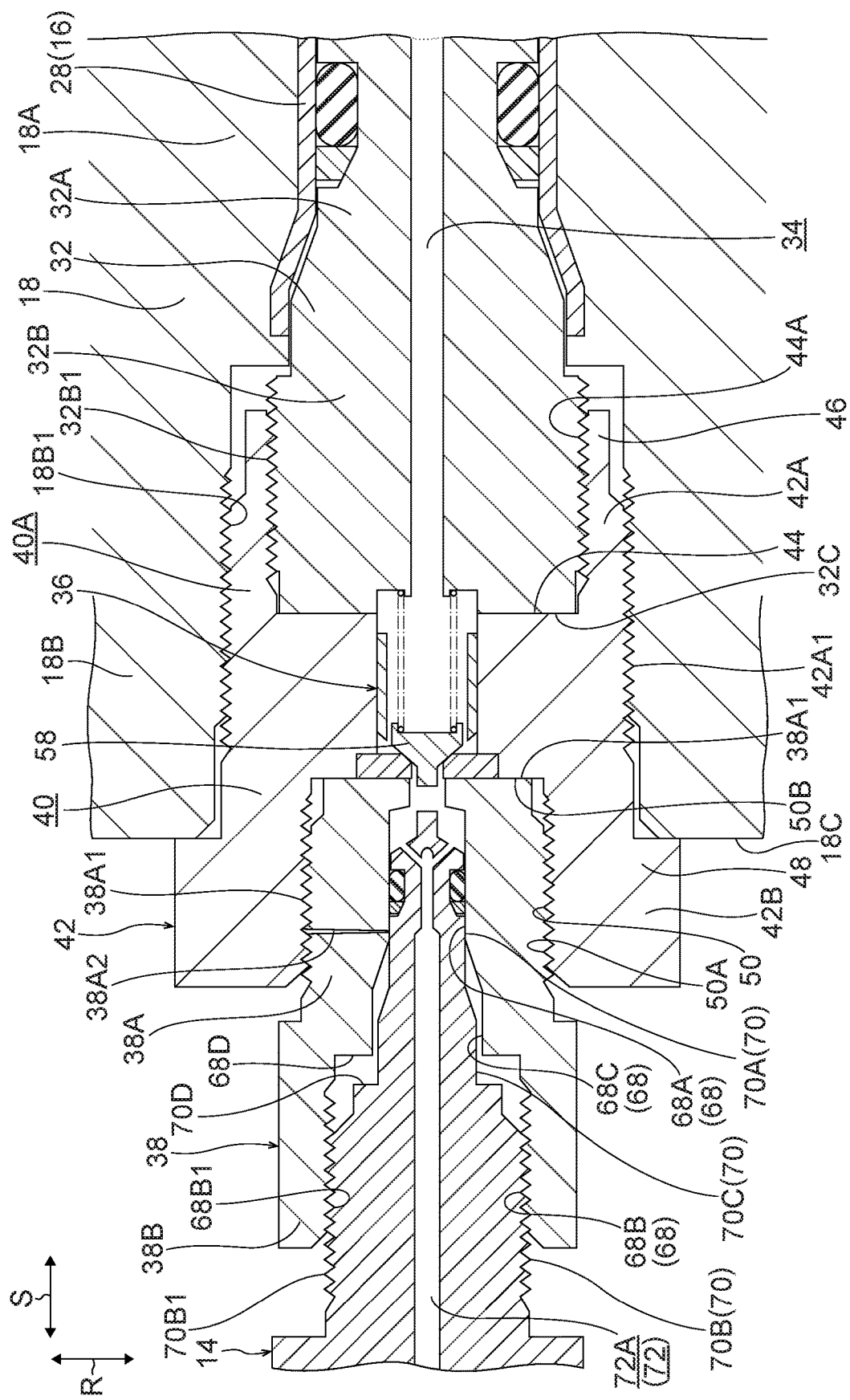
FIG. 2 is a cross-sectional view in which a first opening end portion side of the high-pressure gas tank, to which the high-pressure gas tank connection structure relating to the present embodiment is applied, is illustrated in an enlarged manner.

As illustrated in FIG. 1 and FIG. 2, a check valve 36, a tank side connector 38 and the connection side connector 14 are provided at the nozzle member 32 on the axis of the nozzle portion 34 in that order toward the outer side of the liner 16. The connection side connector 14 is connected to the tank side connector 38.

The mouthpiece 18 is provided over axial direction portions of the nozzle member 32 and the tank side connector 38. A gap 40 is provided in the radial direction between the mouthpiece 18 and the nozzle member 32, and between the mouthpiece 18 and the tank side connector 38, respectively. Therefore, an adapter 42 that is connected to these members is provided within the gap 40, and the check valve 36 is provided at the axially central portion of the adapter 42.

More specifically, the axial direction one end portion 18A side of the mouthpiece 18 is mounted to the opening tube portion 28 of the liner 16. A female screw portion 18B1 is formed at the axial direction another end portion 18B side of the mouthpiece 18, and a gap 40A is provided in the radial direction of the mouthpiece 18 between the female screw portion 18B1 and the nozzle member 32.

An axial direction one end portion 32A of the nozzle member 32 is mounted to the interior of the opening tube portion 28 of the liner 16. An axial direction another end portion 32B of the nozzle member 32 is exposed from the liner 16. Further, the another end portion 32B of the nozzle member 32 can face the mouthpiece 18. A male screw portion 32B1 is formed at the another end portion 32B of the nozzle member 32, at the same pitch as the female screw portion 18B1 formed at the mouthpiece 18.

An axial direction one end portion 42A of the adapter 42 is connected to the mouthpiece 18 and the nozzle member 32. The tank side connector 38 is connected to an axial direction another end portion 42B of the adapter 42. Further, the check valve 36 is provided at the axial direction central portion of the adapter 42.

A male screw portion 42A1, which can be screwed-together with the female screw portion 18B1 of the mouthpiece 18, is formed at the outer peripheral surface of the one end portion 42A of the adapter 42. Further, a concave portion 44, which is substantially shaped as a solid cylinder and to which the another end portion 32B of the nozzle member 32 can be connected, is formed at the one end portion 42A of the adapter 42. A female screw portion 44A, which can be screwed-together with the male screw portion 32B1 of the nozzle member 32, is formed at the inner peripheral surface of the concave portion 44, at the same pitch as the female screw portion 18B1 that is formed in the mouthpiece 18.

Figure 3:
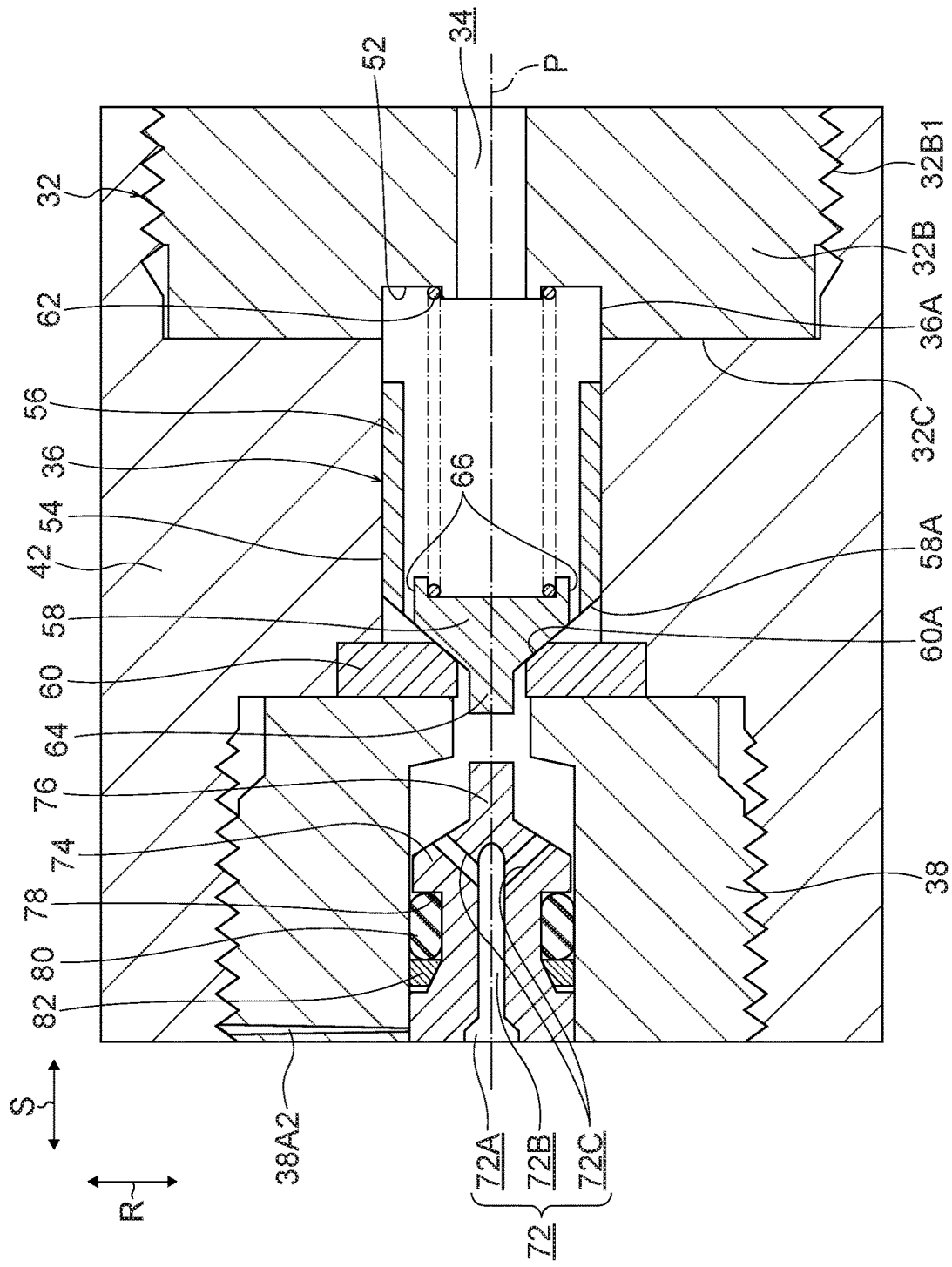
FIG. 3 is a cross-sectional view in which main portions of FIG. 2 are enlarged and that illustrates a state in which a valve body of a check valve, which is provided at the first opening end portion side of the high-pressure gas tank to which the high-pressure gas tank connection structure relating to the present embodiment is applied, is in a closed state.

As illustrated in FIG. 3, a mounting concave portion 52, which communicates with the nozzle portion 34, is provided at the central portion of an outer end surface 32C of the nozzle member 32. An axial direction one end portion 36A of the check valve 36 is mounted to the mounting concave portion 52.

Here, in the present embodiment, the check valve 36 is structured to include an outer tube 54 that forms the outer shape of the check valve 36, an inner tube 56 that is accommodated within the outer tube 54 and in which is provided a valve body 58 that can move along the axial direction of the outer tube 54, an abutment member 60 that can be abutted by the valve body 58 and that can open and close the valve body 58, and a spring 62 that urges the valve body 58 (the inner tube 56) toward the abutment member 60 side.

For example, in the present embodiment, the outer tube 54 is formed in the shape of a cylindrical tube, the inner tube 56 is formed in the shape of a cylindrical tube having a bottom, and the bottom portion of the inner tube 56 is made to be the valve body 58. In this case, although not illustrated, peripheral direction rotation of the outer tube 54 is suppressed due to the outer peripheral surface of the outer tube 54 being knurled, and groove portions that can engage with the knurling being formed at the adapter 42 side, or the like. Of course, the outer tube 54 may be formed in the shape of an angular tube. In this case, knurling is unnecessary.

On the other hand, the valve body 58 is formed in a substantially conical shape, and a solid cylindrical boss 64 is provided at the distal end thereof so as to project-out along the axial direction of the check valve 36. The abutment member 60 is formed in an annular shape, and the boss 64 is inserted through the axially central portion of the abutment member 60 in a state in which a gap is provided therebetween. A taper surface 60A, whose angle of inclination with respect to axis P of the liner 16 is set to be the same as or slightly smaller than that of a taper surface 58A formed at the valve body 58, is formed at the inner edge portion of the abutment member 60.

Due thereto, even if there is dispersion between the angles at the taper surface 58A and the taper surface 60A, the valve body 58 can reliably be made to abut the abutment member 60. Further, in the state in which the taper surface 58A of the valve body 58 abuts the taper surface 60A of the abutment member 60, the distal end of the boss 64 projects-out further than being flush with the abutment member 60.

Further, plural through-holes 66 that pass through in the wall thickness direction of the valve body 58 are formed in the valve body 58 along the peripheral direction of the valve body 58 at further toward the radial direction outer side than the taper surface 60A of the abutment member 60. The interior of the outer tube 54, the interior of the inner tube 56 and the nozzle portion 34 communicate via these through-holes 66.

Here, as illustrated in FIG. 2, at the one end portion 42A of the adapter 42, a wall portion 46 that forms the concave portion 44 has a wall thickness such that the wall portion 46 can enter into the gap 40A. For example, in the state in which the check valve 36 is mounted to the nozzle member 32, the adapter 42 is rotated along the peripheral direction thereof, and the male screw portion 42A1 of the adapter 42 is screwed-together with the female screw portion 18B1 of the mouthpiece 18, and the female screw portion 44A of the adapter 42 is screwed-together with the male screw portion 32B1 of the nozzle member 32.

Due thereto, in the state in which the check valve 36 is accommodated in the axially central portion of the adapter 42, the one end portion 42A of the adapter 42 is connected to the mouthpiece 18 and the nozzle member 32. Further, a stopper 48, which is annular and can abut an outer end surface 18C of the mouthpiece 18, is provided at the another end portion 42B side of the adapter 42. The adapter 42 can rotate up until this stopper 48 abuts the outer end surface 18C of the mouthpiece 18.

On the other hand, a concave portion 50, which is substantially shaped as a solid cylinder and that can be connected to an axial direction one end portion 38A of the tank side connector 38, is formed at the another end portion 42B of the adapter 42. A female screw portion 50A, which can be screwed-together with a male screw portion 38A1 formed at the one end portion 38A of the tank side connector 38, is formed at the inner peripheral surface of the concave portion 50.

Therefore, when the tank side connector 38 is rotated along the peripheral direction thereof, and the male screw portion 38A1 of the tank side connector 38 is screwed-together with the female screw portion 50A of the adapter 42, the one end portion 38A of the tank side connector 38 is connected to the adapter 42. The tank side connector 38 can rotate until the distal end 38A1 of the one end portion 38A side of the tank side connector 38 abuts bottom surface 50B of the concave portion 50 of the adapter 42.

Here, the bottom surface 50B of the concave portion 50 of the adapter 42 and the abutment member 60 are substantially flush. In the state in which the one end portion 38A of the tank side connector 38 abuts the bottom surface 50B of the concave portion 50 of the adapter 42, the one end portion 38A of the tank side connector 38 abuts the abutment member 60. Namely, in the state in which the one end portion 38A of the tank side connector 38 abuts the abutment member 60, the check valve 36 is accommodated at a predetermined position.

Further, the connection side connector 14 is connected to the tank side connector 38. The tank side connector 38 is formed substantially in the shape of a cylindrical tube, and a concave portion 68 is formed at the inner side thereof. The concave portion 68 is structured to include a small diameter concave portion 68A that is provided at the one end portion 38A side of the tank side connector 38, and a large diameter concave portion 68B that is provided at the another end portion 38B side and whose diameter is larger than that of the small diameter concave portion 68A.

Moreover, a medium diameter concave portion 68C, whose diameter is larger than that of the small diameter concave portion 68A and smaller than that of the large diameter concave portion 68B, is provided between the small diameter concave portion 68A and the large diameter concave portion 68B. An abutted surface 68D that is formed along the radial direction is provided between the medium diameter concave portion 68C and the large diameter concave portion 68B. Further, a lateral hole portion 38A2 that passes through in the radial direction is formed in the medium diameter concave portion 68C side of the small diameter concave portion 68A. A female screw portion 68B1 is formed at the large diameter concave portion 68B.

On the other hand, the connection side connector 14 is formed substantially in the shape of a solid cylinder, and a convex portion 70 is formed thereat. The convex portion 70 is structured to include a small diameter convex portion 70A that can be inserted in the small diameter concave portion 68A of the tank side connector 38, and a large diameter convex portion 70B that can be joined to the large diameter concave portion 68B of the tank side connector 38.

Moreover, a medium diameter convex portion 70C, whose diameter is larger than that of the small diameter convex portion 70A and smaller than that of the large diameter convex portion 70B, is provided between the small diameter convex portion 70A and the large diameter convex portion 70B. An abutting surface 70D, which is formed along the radial direction and can abut the abutted surface 68D, is provided between the medium diameter convex portion 70C and the large diameter convex portion 70B. A male screw portion 70B1, which can be screwed-together with the female screw portion 68B1 formed at the large diameter concave portion 68B, is formed at the large diameter convex portion 70B.

Here, a flow path 72 is provided at the axially central portion of the connection side connector 14. As illustrated in FIG. 3, the flow path 72 is structured to include a main flow portion 72A, a rectifying portion 72B, and branch portions 72C. The branch portions 72C are provided at the distal end portion of the connection side connector 14.

A conical portion 74 that is formed in a substantially conical shape is provided at the distal end side of the connection side connector 14. The plural branch portions 72C are formed from the conical portion 74 toward the axial center. The hydrogen gases that flow-in from the branch portions 72C merge together and are rectified at the rectifying portion 72B, and pass through the rectifying portion 72B and are guided to the main flow portion 72A.

Further, a boss 76 that is solid cylindrical is provided so as to project-out at the distal end of the conical portion 74. The boss 76 can abut the boss 64 that is provided at the valve body 58 of the check valve 36 (see FIG. 5). A groove portion 78 is formed along the peripheral direction in the outer peripheral surface of the small diameter convex portion 70A, further toward the conical portion 74 side of the small diameter convex portion 70A than the lateral hole portion 38A2.

An O-ring 80 and a backup ring 82 are fit within this groove portion 78. Due to the O-ring 80 and the backup ring 82 being pressed into contact with the inner peripheral surface of the small diameter concave portion 68A of the tank side connector 38, the gap that is formed between the small diameter convex portion 70A of the connection side connector 14 and the small diameter concave portion 68A of the tank side connector 38 is sealed.

Figure 5:
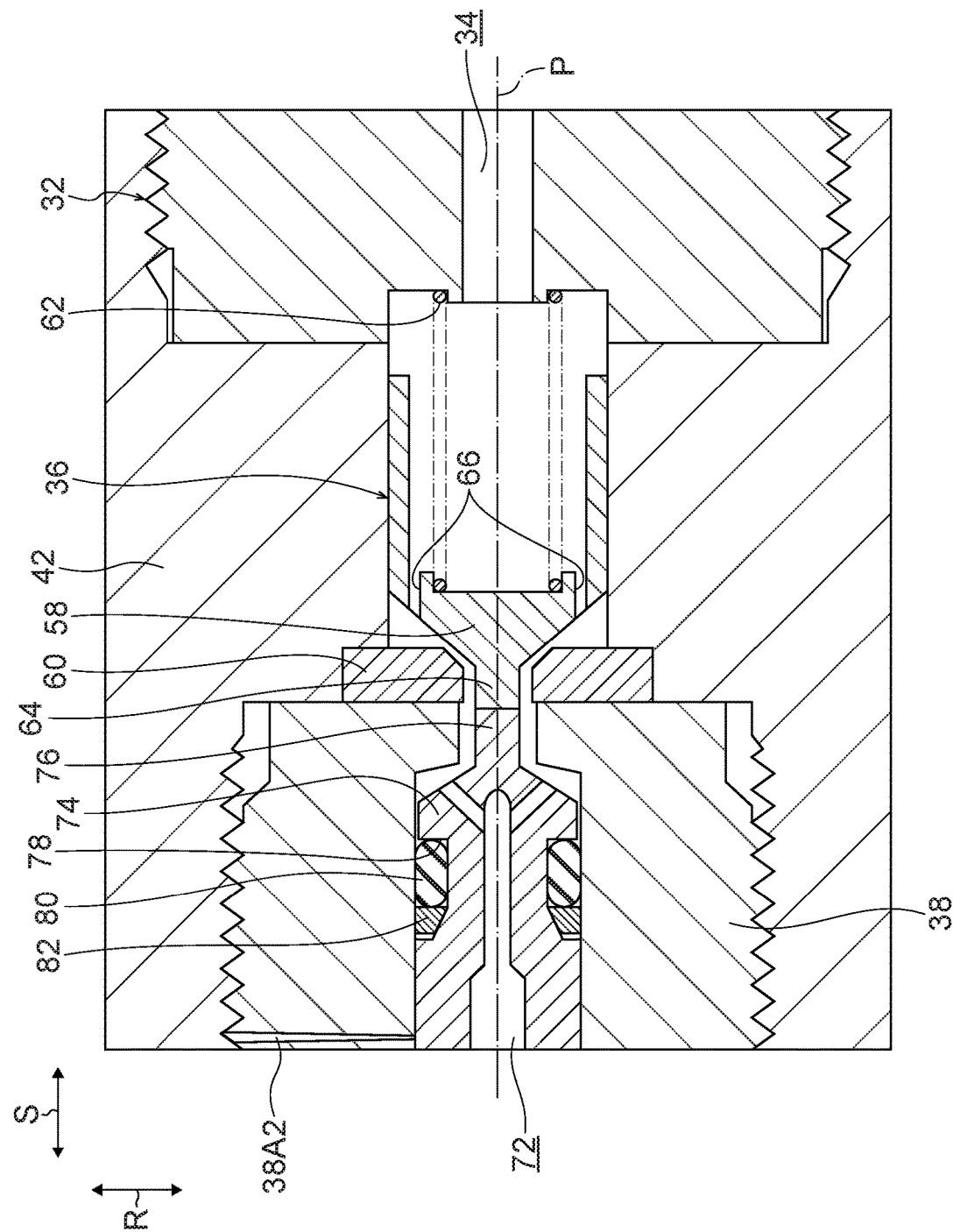
FIG. 5 is a cross-sectional view in which main portions of FIG. 4 are enlarged and that illustrates a state in which the valve body of the check valve, which is provided at the first opening end portion side of the high-pressure gas tank to which the high-pressure gas tank connection structure relating to the present embodiment is applied, is in an open state.

Further, in the present embodiment, when the boss 76, which is formed at the distal end of the connection side connector 14, is, from the state of abutting the boss 64 provided at the distal end of the check valve 36, pushed in the direction against the urging force of the spring 62, the valve body 58 moves away from the abutment member 60 as illustrated in FIG. 5. Due thereto, a gap is provided between the valve body 58 and the abutment member 60, and the valve body 58 enters into a so-called open state.

Figure 4:
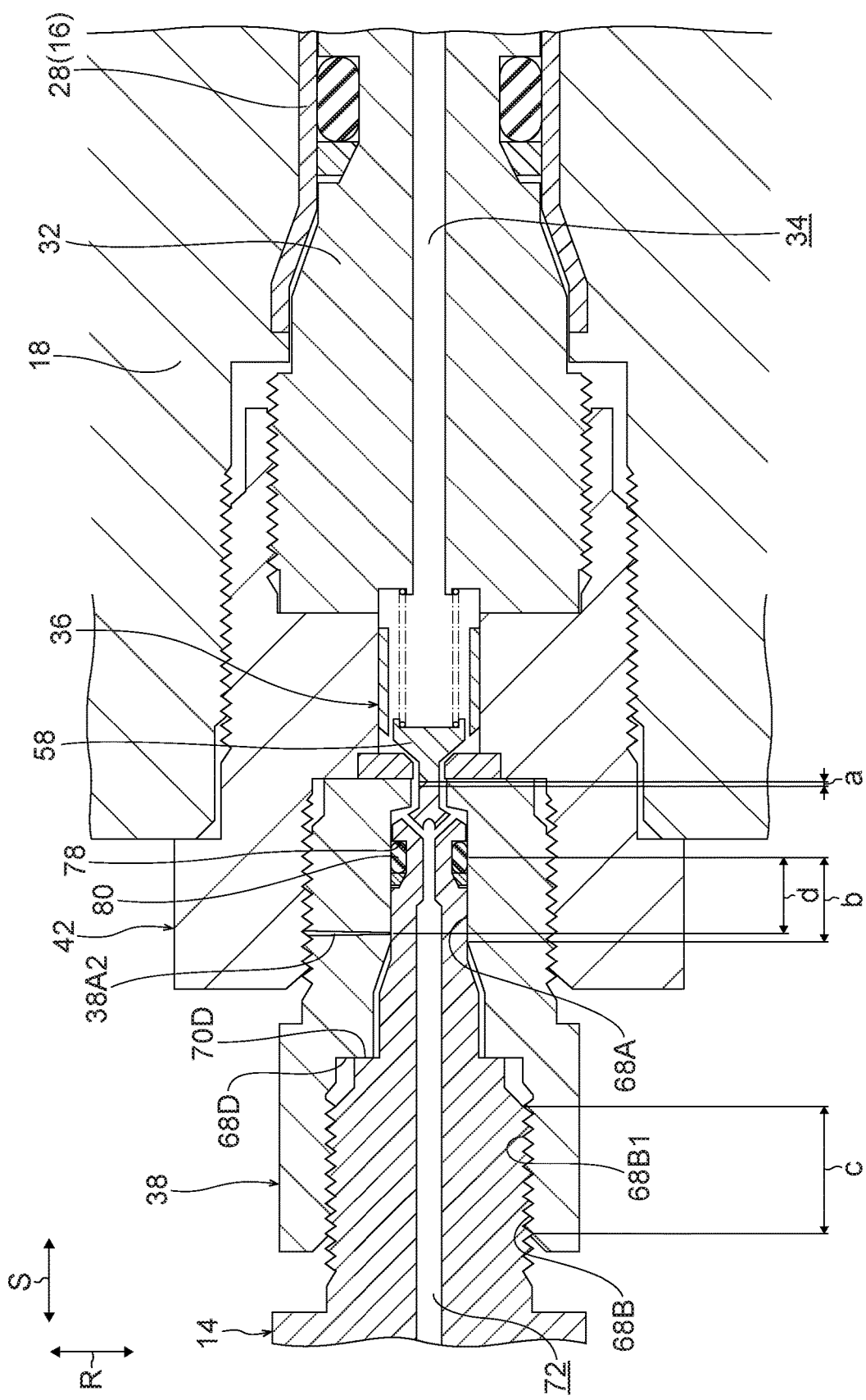
FIG. 4 is a cross-sectional view in which the first opening end portion side of the high-pressure gas tank, to which the high-pressure gas tank connection structure relating to the present embodiment is applied, is illustrated in an enlarged manner.

Further, as illustrated in FIG. 4, in the state in which the abutting surface 70D of the connection side connector 14 abuts the abutted surface 68D of the tank side connector 38, the connection side connector 14 is in a state of being completely joined to the tank side connector 38 (a completely joined state).

Here, the amount of movement of the valve body 58 that moves from the state in which the valve body 58 is closed (see FIG. 3) to the state in which the valve body 58 is open (see FIG. 5) is (a). Further, in the completely joined state illustrated in FIG. 4, the separated distance between the peripheral edge of the small diameter concave portion 68A and the O-ring 80 that is pressed into contact with the inner peripheral surface of the small diameter concave portion 68A of the tank side connector 38 is (b). The separated distance between this O-ring 80 and the lateral hole portion 38A2 is (d).

Moreover, the dimension of the female screw portion 68B1 that is formed at the large diameter concave portion 68B of the tank side connector 38 is (c). This dimension (c) of the female screw portion 38B1 is the amount of movement of the connection side connector 14 from the joined state, in which the connection side connector 14 is completely joined to the tank side connector 38, until the joining is canceled.

The amount of movement (a) of the valve body 58 here corresponds to the "amount of movement of the connection side connector up until the closed valve body opens".

Further, separated distance (b) between the O-ring 80 and the peripheral edge of the small diameter concave portion 68A corresponds to the "amount of movement of the connection side connector, at which a state in which the region between the connection side connector and the concave portion is sealed by the sealing member is maintained".

Moreover, the separated distance (d) between the O-ring 80 and the lateral hole portion 38A2 corresponds to the "separated distance between the lateral hole portion and the sealing member along the axial direction of the tank main body in the completely joined state of the convex portion and the concave portion".

The dimension (c) of the female screw portion 68B1 that is formed in the large diameter concave portion 68B of the tank side connector 38 corresponds to the "amount of movement of the connection side connector from after the convex portion is joined to the concave portion up until a completely joined state of being completely joined is reached" that is recited in claim 3, or the "amount of movement of the connection side connector from the completely joined state of the convex portion to the concave portion up until a canceled state of the joining is reached".

In the present embodiment, separated distance (b) between the peripheral edge of the small diameter concave portion 68A and the O-ring 80 that is pressed into contact with the inner peripheral surface of the small diameter concave portion 68A of the tank side connector 38, i.e., the segment (b) in which the region between the small diameter concave portion 68A of the tank side connector 38 and the small diameter convex portion 70A of the connection side connector 14 is sealed by the O-ring 80, is set to be greater than the amount of movement (a) of the valve body 58, and smaller than the dimension (c) of the female screw portion 68B1 formed at the large diameter concave portion 68B of the tank side connector 38 (a<b<c).

Further, separated distance (d) between the O-ring 80 and the lateral hole portion 38A2 is set to be greater than the amount of movement (a) of the valve body 58 and smaller than the separated distance (b) between the O-ring 80 and the peripheral edge of the small diameter concave portion 68A (a<d<b).

As described above, as illustrated in FIG. 1, the TPRD 84 is provided at the another end portion 16B side of the liner 16. More specifically, the opening tube portion 30 is formed at the another end portion 16B of the liner 16, and the mouthpiece 20 is provided at the radial direction outer side of the opening tube portion 30. An axial direction one end portion 20A side of this mouthpiece 20 is mounted to the opening tube portion 30 of the liner 16, and a female screw portion 20B1 is formed at an axial direction another end portion 20B side of the mouthpiece 20.

Figure 6:
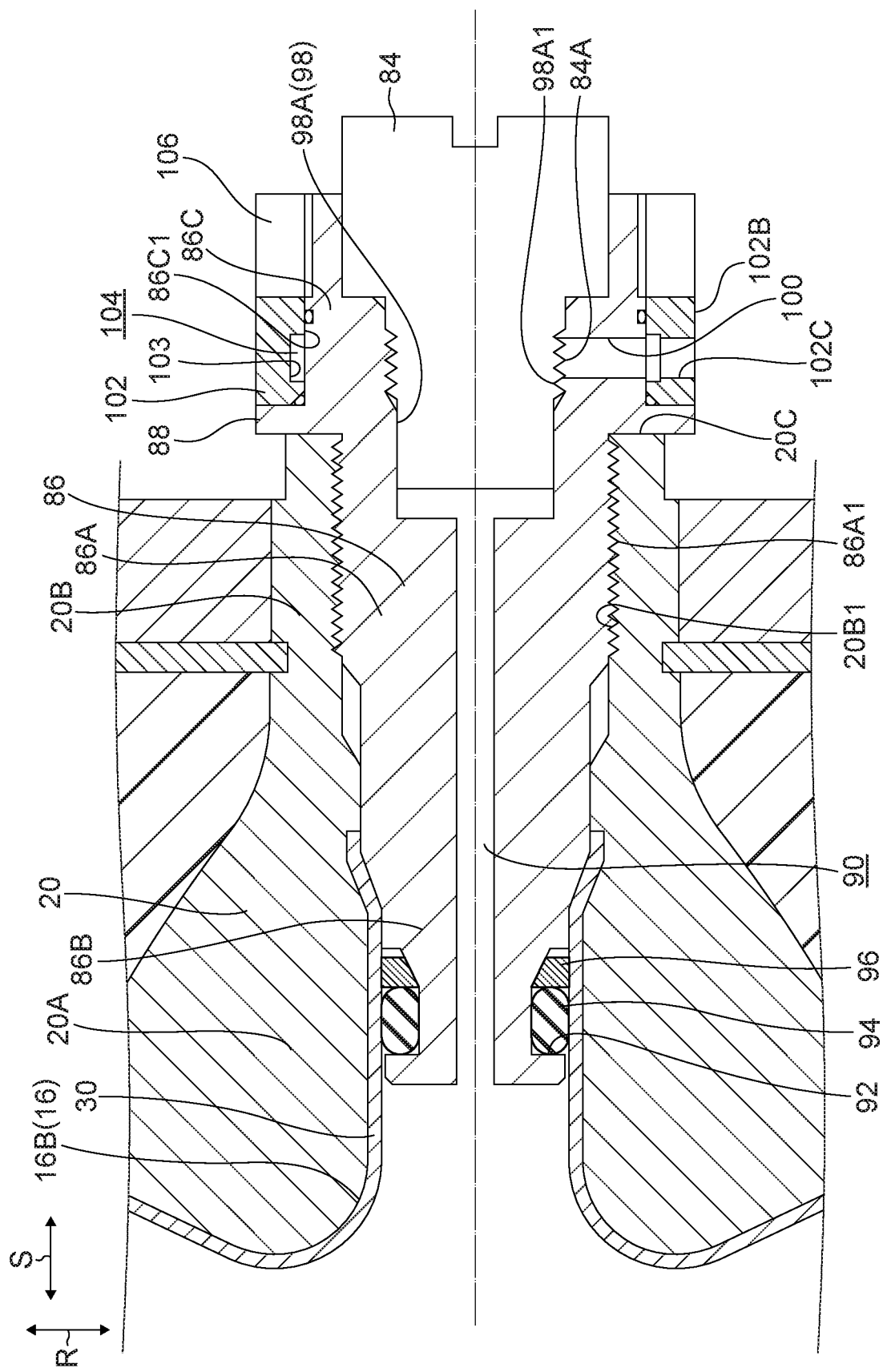
FIG. 6 is a cross-sectional view in which a second opening end portion side of the high-pressure gas tank, to which the high-pressure gas tank connection structure relating to the present embodiment is applied, is illustrated in an enlarged manner.

Here, in the present embodiment, as illustrated in FIG. 6, a fixed member 86 that is formed in a substantially tubular shape is provided at the inner peripheral surface side of the mouthpiece 20, including a portion of the opening tube portion 30. A male screw portion 86A1 that can be screwed-together with the female screw portion 20B1 is formed at an axial direction central portion 86A of the fixed member 86. The fixed member 86 is attached to the mouthpiece 20 due to the male screw portion 86A1 being screwed-together with the female screw portion 20B1 of the mouthpiece 20.

Further, an annular stopper 88 is provided so as to project-out at the outer peripheral surface of the fixed member 86. The stopper 88 can abut an outer end surface 20C of the mouthpiece 20. The fixed member 86 can rotate until the stopper 88 abuts the outer end surface 20C of the mouthpiece 20.

Further, a flow path 90 is provided at the axially central portion of the fixed member 86. The hydrogen gas within the liner 16 can flow-out to the exterior through the flow path 90. An annular groove portion 92 is formed in an axial direction one end portion 86B of the fixed member 86. An O-ring 94 and a backup ring 96 are fit within this groove portion 92. The region between the opening tube portion 30 and the fixed member 86 is sealed due to the O-ring 94 and the backup ring 96 being pressed into contact with the inner peripheral surface of the opening tube portion 30 of the another end portion 16B of the liner 16.

On the other hand, a concave portion 98 that is concave toward the inner side of the liner 16 is formed in an axial direction another end portion 86C of the fixed member 86, along the axial direction of the liner 16. A communication path 100 passes through the axial direction another end portion 86C of the fixed member 86 along the direction orthogonal to the axial direction of the fixed member 86, from an inner peripheral surface 98A of the concave portion 98 over to an outer peripheral surface 86C1 at the axial direction another end portion 86C of the fixed member 86.

The TPRD 84 that is substantially shaped as a solid cylinder is mounted to the concave portion 98. For example, a female screw portion 98A1 is formed at the concave portion 98. On the other hand, a male screw portion 84A that can be screwed together with the female screw portion 98A1 is formed at the TPRD 84. The TPRD 84 is mounted to the concave portion 98 due to the male screw portion 84A being screwed-together with the female screw portion 98A1 of the concave portion 98.

Further, a valve body (not illustrated) is provided at the TPRD 84 along the axial direction of the TPRD 84. The valve body can move along the axial direction of the TPRD 84. When the hydrogen gas that is filled in the high-pressure gas tank 12 expands due to the temperature at the periphery of the high-pressure gas tank 12 rising, this valve body moves along the axial direction of the liner 16 toward the outer side of the liner 16.

Due to the movement of this valve body, the flow path 90 of the fixed member 86 and the communication path 100 can communicate with one another. In the state in which the flow path 90 of the fixed member 86 and the communication path 100 communicate with one another, the hydrogen gas within high-pressure gas tank 12 can be released (can flow-out) to the exterior.

Figure 7A:
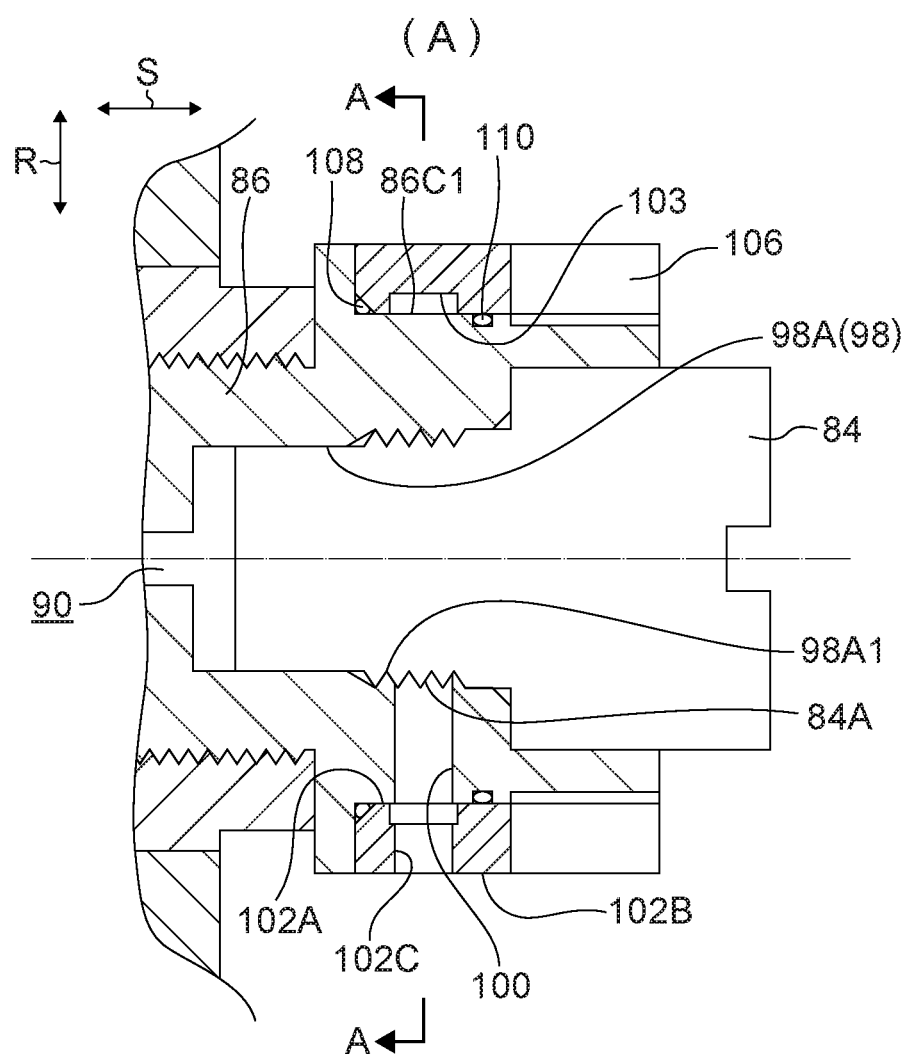
FIG. 7A is a cross-sectional view in which main portions of FIG. 6 at the high-pressure gas tank, to which the high-pressure gas tank connection structure relating to the present embodiment is applied, are enlarged.
Figure 7B:
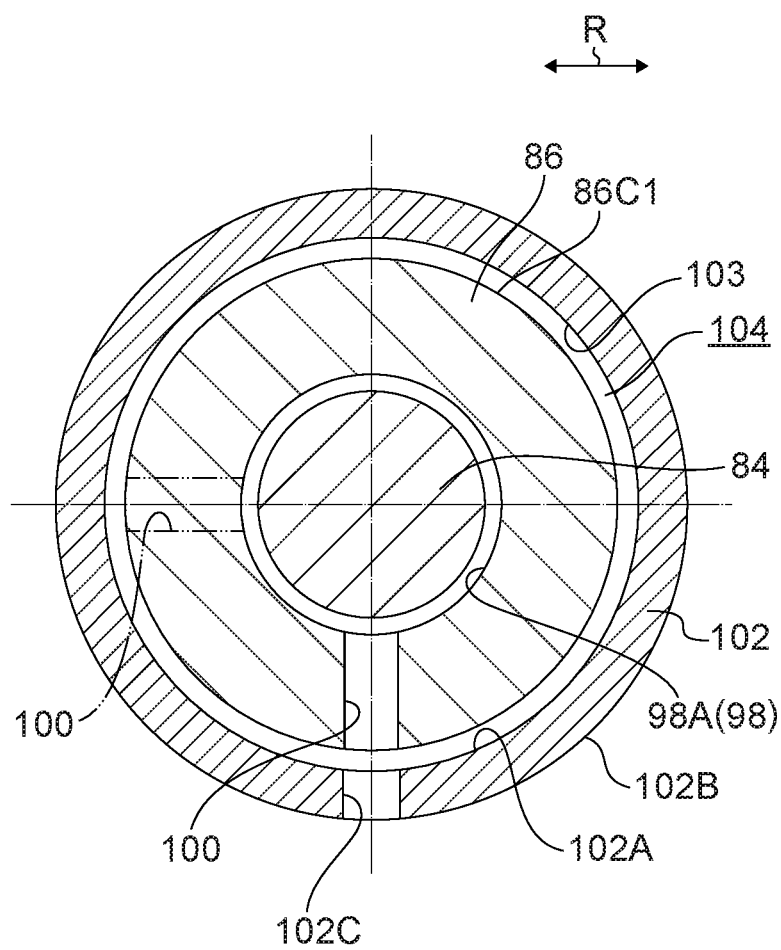
FIG. 7B is a cross-sectional view cut along line A-A of FIG. 7A.

Moreover, in the present embodiment, as illustrated in FIG. 7A and FIG. 7B, a ring 102, which abuts the stopper 88 and is formed in the shape of a cylindrical tube, is provided at the outer peripheral surface 86C1 of the axial direction another end portion 86C of the fixed member 86. A groove portion 103 that is annular is formed in an inner peripheral surface 102A of the ring 102 at the axial direction central portion. This groove portion 103 can communicate with the communication path 100. Due to this groove portion 103, a gap 104 is provided between the ring 102 and the outer peripheral surface 86C1 of the fixed member 86. Note that the ring 102 can rotate along the peripheral direction of the fixed member 86.

Here, a nut 106 is fastened to the outer peripheral surface 86C1 of the axial direction another end portion 86C of the fixed member 86 at further toward the axial direction outer side of the high-pressure gas tank 12 than the ring 102. Movement of the ring 102 along the axial direction with respect to the fixed member 86 is restricted by this nut 106.

Further, a jetting port 102C, which passes through from the inner peripheral surface 102A of the ring 102 to an outer peripheral surface 102B, is provided at the ring 102. Namely, this jetting port 102C can communicate with the communication path 100 through the gap 104 that is provided between the ring 102 and the outer peripheral surface 86C1 of the fixed member 86.

On the other hand, O-rings 108, 110 are provided between the inner peripheral surface 102A of the ring 102 and the outer peripheral surface 86C1 of the fixed member 86. The O-ring 108 is provided between the ring 102 and the stopper 88, and the O-ring 110 is provided at the outer peripheral surface 86C1 of the fixed member 86. Due to the O-rings 108, 110 being pressed into contact, at the both sides of the groove portion 103 along the axial direction of the ring 102, the regions between the inner peripheral surface 102A of the ring 102 and the outer peripheral surface 86C1 of the fixed member 86 are sealed. However, these O-rings 108, 110 are not absolutely necessary.

(Operation and Effects of High-Pressure Gas Tank Connection Structure) Operation and effects of the high-pressure gas tank connection structure 10 relating to the embodiment of the present disclosure are described next.

As illustrated in FIG. 2, the high-pressure gas tank connection structure 10 of the present embodiment has the liner 16, the tank side connector 38, the connection side connector 14, and the valve body 58. The tank side connector 38 is formed in a tubular shape, and is disposed on the axis P of the liner 16, and is mounted to the mouthpiece 18. The concave portion 68 that is concave toward the inner side of the liner 16 is formed along the axial direction of the liner 16.

The region between the connection side connector 14 and the tank side connector 38 is sealed, and the connection side connector 14 can move along the axial direction of the liner 16 with respect to the tank side connector 38. Further, the convex portion 70, which can be joined with the concave portion 68 formed at the tank side connector 38 side, is formed at the connection side connector 14.

The valve body 58 is provided further toward the deep side along the axial direction of the liner 16 than the tank side connector 38, and is urged toward the connection side connector 14 side. In the state in which the convex portion 70 formed at the connection side connector 14 is joined with the concave portion 68 formed in the tank side connector 38, when the valve body 58 is pushed by the distal end of the convex portion 70, the valve body 58 is opened from its closed state, and the interior and the exterior of the liner 16 are communicated.

In this way, in the present embodiment, the valve body 58 is provided further toward the deep side along the axial direction of the liner 16 than the connection side connector 14, and the valve body 58 is not provided at the outer side of the liner 16. Therefore, as compared with an unillustrated case in which the valve body 58 is provided at the outer side of the liner 16, the high-pressure gas tank 12 can be connected easily via the connection side connector 14 that is, for example, connected to a fuel stack that serves as a supply member and structures a portion of an unillustrated tank module.

Further, in the present embodiment, in the state in which the convex portion 70 formed at the connection side connector 14 is joined to the concave portion 68 formed at the tank side connector 38, when the valve body 58, which is urged toward the connection side connector 14 side, is pushed by the distal end of the convex portion 70 against the urging force that urges the valve body 58 toward the connection side connector 14 side, the valve body 58 is opened from the closed state.

To put it another way, in the state in which the convex portion 70 formed at the connection side connector 14 is joined to the concave portion 68 formed in the tank side connector 38, if the valve body 58 is not pushed by the distal end of the convex portion 70, the closed state of the valve body 58 is maintained.

In this way, by making it possible to close the valve body 58 in the state in which the connection side connector 14 is joined to the tank side connector 38, leaking of the gas that is within the liner 16 can be suppressed. Further, by opening the valve body 58 in the state in which the connection side connector 14 is joined to the tank side connector 38, the liner 16 coming out of place can be suppressed.

Further, in the present embodiment, in the state in which the convex portion 70 formed at the connection side connector 14 is joined to the concave portion 68 formed in the tank side connector 38, the connection side connector 14 can move along the axial direction of the liner 16 with respect to the tank side connector 38.

Moreover, the O-ring 80 is provided at the outer peripheral surface of the small diameter convex portion 70A that is formed at the connection side connector 14. This O-ring 80 contacts the inner peripheral surface of the small diameter concave portion 68A that is formed at the tank side connector 38, and seals the region between the small diameter convex portion 70A and the small diameter concave portion 68A.

Here, in the state in which the opened valve body 58 is closed by the distal end of the convex portion 70 formed at the connection side connector 14, the state in which the region between the small diameter convex portion 70A and the small diameter concave portion 68A formed at the tank side connector 38 is sealed by the O-ring 80 is maintained. Due thereto, in the state in which the connection side connector 14 is joined to the tank side connector 38 and the valve body 58 is closed, leaking of the gas that is within the liner 16 can be suppressed.

Moreover, in the present embodiment, the amount of movement (b) of the connection side connector 14, at which the state in which the region between the connection side connector 14 and the small diameter concave portion 68A that is formed in the tank side connector 38 is sealed by the O-ring 80 is maintained, is set to be larger than the amount of movement (a) of the valve body 58 that is pushed and closed by the distal end of the convex portion 70 formed at the connection side connector 14, and smaller than the amount of movement of the connection side connector 14 from after the connection side connector 14 is joined to the tank side connector 38 up until the completely joined state (see FIG. 4) is reached, i.e., the dimension (c) of the female screw portion 68B1 that is formed at the large diameter concave portion 68B of the tank side connector 38 (a<b<c).

Due thereto, the connection side connector 14 is joined to the tank side connector 38, and the region between the connection side connector 14 and the concave portion 68 formed at the tank side connector 38 is sealed by the O-ring 80, and thereafter, the distal end of the convex portion 70 of the connection side connector 14 pushes the valve body 58, and the valve body 58 is opened.

Accordingly, in the present embodiment, leaking of hydrogen gas at the time of opening the valve body 58 can be suppressed. Namely, in the present embodiment, because the valve body 58 is opened in a state in which the region between the connection side connector 14 and the tank side connector 38 is sealed by the O-ring 80, leaking of the gas that is within the liner 16 can be suppressed.

Further, in the present embodiment, at the concave portion 68 that is formed in the tank side connector 38, the lateral hole portion 38A2 that communicates with the exterior passes through in the direction orthogonal to the axial direction of the liner 16 at a position that is further away from the valve body 58 than the O-ring 80. Namely, the interior and the exterior of the concave portion 68 formed in the tank side connector 38 are communicated via this lateral hole portion 38A2.

Here, separated distance (d) between the O-ring 80 and the lateral hole portion 38A2 along the axial direction of the liner 16 is set to be greater than the amount of movement (a) of the valve body 58 that is pushed and closed by the distal end of the convex portion 70 formed at the connection side connector 14, and smaller than the amount of movement (b) of the connection side connector 14 at which the state in which the region between the connection side connector 14 and the small diameter concave portion 68A formed in the tank side connector 38 is sealed by the O-ring 80 is maintained (a<d<b).

Due thereto, when the connection side connector 14 that is joined to the tank side connector 38 is moved along the axial direction of the liner 16 in the direction in which the joined state is canceled, first, the distal end of the convex portion 70 of the connection side connector 14 moves apart from the valve body 58, and the valve body 58 enters into the closed state from the opened state.

The amount of movement (a) of the connection side connector 14 at this time is smaller than the separated distance (d) between the O-ring 80 and the lateral hole portion 38A2 along the axial direction of the liner 16. Therefore, in the state in which the valve body 58 is closed, the state in which the region between the outer peripheral surface of the small diameter convex portion 70A formed at the connection side connector 14 and the inner peripheral surface of the small diameter concave portion 68A formed at the tank side connector 38 is sealed by the O-ring 80 is maintained.

When, from this state, the connection side connector 14 is moved further along the axial direction of the liner 16 in the direction in which the joined state is canceled, the O-ring 80 passes-by the lateral hole portion 38A2. Due thereto, the hydrogen gas that stays within the concave portion 68 flows-out through the lateral hole portion 38A2 to the exterior, and the pressure at the interior of the concave portion 68 is released.

Here, the separated distance (d) between the O-ring 80 and the lateral hole portion 38A2 is smaller than the amount of movement (c) of the connection side connector 14 from the completely joined state of the connection side connector 14 to the tank side connector 38 (see FIG. 4) up until the canceled state is reached.

Therefore, when the pressure at the interior of the concave portion 68 is released through the lateral hole portion 38A2, there is a state in which the connection side connector 14 is joined to the tank side connector 38. Accordingly, in the present embodiment, when the pressure at the interior of the concave portion 68 is released through the lateral hole portion 38A2, the high-pressure gas tank 12 coming out of place can be suppressed. Further, the O-ring 80 being pushed-out from the groove portion 78 by pressure can be suppressed.

In the present embodiment, the check valve 36 is provided at the one end portion 16A side of the liner 16, and the TPRD 84 is provided at the another end portion 16B side of the liner 16. In this way, in the present embodiment, at the high-pressure gas tank 12, the TPRD 84 is provided at the opposite side of the valve body 58 that is for supplying hydrogen gas. Due thereto, in the present embodiment, the structure of the high-pressure gas tank 12 can be made to be simple as compared with a case in which the valve body 58 and the TPRD 84 are provided at the one end portion 16A side of the liner 16, although such a case is not illustrated.

Further, if the check valve 36 and the TPRD 84 are provided at the one end portion 16A side of the liner 16, because the TPRD 84 is provided at the outer side of the check valve 36, it is difficult to ensure space for the TPRD 84, and, as a result, the internal capacity of the liner 16 is reduced.

Accordingly, in the present embodiment, the check valve 36 is provided at the one end portion 16A side of the liner 16, and the TPRD 84 is provided at the another end portion 16B side of the liner 16. Due thereto, the high-pressure gas tank 12 can be formed more reasonably, while ensuring the internal capacity of the liner 16.

On the other hand, in the present embodiment, the fixed member 86 that is tubular is mounted to the another end portion 16B side of the liner 16, and the concave portion 98, which is concave toward the inner side of the liner 16, is formed in the fixed member 86 along the axial direction of the liner 16, and the TPRD 84 is mounted to the concave portion 98. The female screw portion 98A1 is formed in the concave portion 98, and the male screw portion 84A is formed at the TPRD 84. Therefore, the TPRD 84 is mounted to the concave portion 98 due to the male screw portion 84A formed at the TPRD 84 being screwed-together with the female screw portion 98A1 formed at the concave portion 98.

Here, the communication path 100, which passes through along the direction orthogonal to the axial direction of the fixed member 86 from the inner peripheral surface 98A of the concave portion 98 over to the outer peripheral surface 86C1 of the fixed member 86, is provided at the concave portion 98. When the high-pressure gas is released, the flow path 90 of the fixed member 86 and the communication path 100 communicate with one another by the valve body (not illustrated) provided at the TPRD 84, and an interior 15 and exterior 17 of the liner 16 can communicate with one another.

Further, as illustrated in FIG. 7A and FIG. 7B, the ring 102 which, together with the outer peripheral surface 86C1 of the fixed member 86, forms the gap 104, is provided at the fixed member 86. The jetting port 102C is formed in the ring 102. The jetting port 102C passes through from the inner peripheral surface 102A of the ring 102 over to the outer peripheral surface 102B. The jetting port 102C can communicate with the communication path 100 through the gap 104 that is provided between the ring 102 and the outer peripheral surface 86C1 of the fixed member 86.

As described above, in the present embodiment, the communication path 100 is formed in the concave portion 98 of the fixed member 86. The jetting port 102C, which can communicate with the communication path 100 through the gap 104, is formed in the ring 102 that, together with the outer peripheral surface 86C1 of the fixed member 86, forms the gap 104. Due thereto, when the high-pressure gas is released, this high-pressure gas passes through the flow path 90 of the fixed member 86 and the communication path 100, and passes through the gap 104, and is jetted-out from the jetting port 102C formed in the ring 102.

In general, although not illustrated, a safety valve is made integral with a jetting port that jets-out a high-pressure gas, and is fixed to a high-pressure gas tank. As described above, because a TPRD is screwed-together with and mounted to the high-pressure gas tank, there are cases in which the position of the TPRD is offset in the peripheral direction of the high-pressure gas tank due to dispersion. Therefore, there are cases in which, depending on the orientation of the high-pressure gas tank, the orientation of the jetting port is different than that which is expected. In this case, the orientation of the high-pressure gas tank must be changed so as to accord with the orientation of the jetting port, and the work is troublesome.

In contrast, in the present embodiment, the gap 104 is provided between the ring 102 and the outer peripheral surface 86C1 of the fixed member 86. Therefore, as shown by the two-dot chain line in FIG. 7B, the high-pressure gas, which is released from the flow path 90 at the axially central side of the fixed member 86 through the communication path 100, can pass through the gap 104 and be jetted-out from the jetting port 102C even if the position of the jetting port 102C formed in the ring 102 and the position of the communication path 100 formed in the fixed member 86 do not face one another.

Further, in the present embodiment, as illustrated in FIG. 7A and FIG. 7B, the gap 104 is provided between the ring 102 and the outer peripheral surface 86C1 of the fixed member 86, and the ring 102 can rotate along the peripheral direction with respect to the fixed member 86. Accordingly, the position of the jetting port 102C can be changed by rotating the ring 102 along the peripheral direction of the fixed member 86, in association with the mounting position of the liner 16. Due thereto, in the present embodiment, work for rotating the liner 16 along the peripheral direction and mounting the liner 16 so as to accord with the position of the jetting port 102C that jets-out the high-pressure gas, and the like, are not needed, and the workability improves.

In the present embodiment, the nut 106 is provided at the outer side of the ring 102 along the axial direction of the liner 16, and the ring 102 is fixed to the fixed member 86 by the nut 106. Due to the ring 102 being fixed to the fixed member 86 by the nut 106 in this way, in the present embodiment, the ring 102 can be fixed to the fixed member 86 by a simple operation, as compared with an unillustrated case in which, for example, the ring 102 is fixed to the fixed member 86 by welding or the like. Moreover, in the present embodiment, after the ring 102 is fixed to the fixed member 86, the position of the ring 102 can be changed.

Moreover, in the present embodiment, the groove portion 103 that is annular is provided concavely at the inner peripheral surface 102A of the ring 102. Due thereto, the gap 104 is provided between the ring 102 and the outer peripheral surface 86C1 of the fixed member 86. Namely, at the ring 102, the both sides of the groove portion 103 along the axial direction of the ring 102 can abut the outer peripheral surface 86C1 of the fixed member 86. Therefore, in the state in which the ring 102 abuts the outer peripheral surface 86C1 of the fixed member 86, movement of the ring 102 along the direction orthogonal to the axial direction of the fixed member 86 is restricted. Due thereto, positional offset between the axial center of the fixed member 86 and the axial center of the ring 102 can be suppressed.

Note that, although the present embodiment describes an example in which the ring 102 is formed in the shape of a cylindrical tube, it suffices for, at the time of jetting-out the high-pressure gas, the high-pressure gas to be able to pass through the flow path 90 of the fixed member 86 and the communication path 100, and pass through the gap 104 provided between the outer peripheral surface 86C1 of the fixed member 86 and the inner peripheral surface 102A of the ring 102, and be jetted-out from the jetting port 102C formed in the ring 102. Therefore, the shape of the ring 102 is not limited to the above.

For example, although not illustrated, the ring 102 may be formed such that the cross-sectional shape along the axial direction thereof is a backward L-shape, and the ring 102 may be a shape in which the portion thereof, which is further toward the outer side in the axial direction of the liner 16 than the region that faces the communication path 100 formed in the fixed member 86, can abut the outer peripheral surface 86C1 of the fixed member 86. Further, a gap that can communicate with the communication path 100 may be formed by providing an O-ring between the outer peripheral surface 86C1 of the fixed member 86 and the inner peripheral surface 102A of the ring 102.

Moreover, in the present embodiment, the protector 26 is provided at the outer side of the liner 16, and an air layer or a heat insulating layer is formed between the protector 26 and the liner 16. Due thereto, at the high-pressure gas tank 12, a heat insulating effect and a shock absorbing effect can be obtained. Note that, depending on the specifications of the high-pressure gas tank 12, this protector 26 is not absolutely necessary.

Further, in the present embodiment, the female screw portion 68B1 is formed at the tank side connector 38, and the male screw portion 70B1 is formed at the connection side connector 14, and the connection side connector 14 is screwed-together with the tank side connector 38, and the connection side connector 14 is moved along the axial direction of the tank side connector 38.

However, it suffices to be able to move the connection side connector 14 along the axial direction of the tank side connector 38, and to be to join the connection side connector 14 to the tank side connector 38. Therefore, the present disclosure is not limited to the above. For example, although not illustrated, a lever type mechanism may be applied in which, by rotating a lever that is provided at the connection side connector 14, the connection side connector 14 is slid along the axial direction of the tank side connector 38.

Further, the gas that is filled in the liner 16 is not limited to hydrogen. For example, a gas such as helium, nitrogen or the like can be filled in the liner 16. Further, it suffices for the reinforcing layer 22 to be made of a fiber reinforced plastic (FRP), and the material thereof is not limited to carbon fiber reinforced plastic (CFRP).

Supplemental Items Relating to the Present Embodiment (Structure 1)

A high-pressure gas tank including: a fixed member that is formed in a tubular shape, and is mounted to an axial direction one end portion side of a tank main body, and at which a thermally-activated pressure relief device is mounted to a concave portion that is formed along an axial direction of the tank main body so as to be concave toward an inner side of the tank main body; a communication path that passes through from an inner surface over to an outer surface of the concave portion along a direction orthogonal to an axial direction of the fixed member at the concave portion, and that, when high-pressure gas is released, communicates an interior and an exterior of the tank main body by a safety valve provided at the thermally-activated pressure relief device; a ring that is attached to an outer surface of the fixed member such that a gap is formed therebetween, and whose movement along an axial direction with respect to the fixed member is restricted; and a jetting port that is formed in the ring, and passes through from an inner surface over to an outer surface of the ring, and that can communicate the communication path and an exterior through the gap.

Namely, in this structure, the axial direction another end portion side of the tank main body is not particularly limited. For example, the tank side connector 38, the connection side connector 14, the check valve 36 and the like that are described in the above embodiment are not absolutely necessary.

Generally, a safety valve is made integral with a jetting port that jets-out high-pressure gas, and is fixed to a high-pressure gas tank. Therefore, there are cases in which, depending on the orientation of the high-pressure gas tank, the orientation of the jetting port is different than that which is expected. In this case, the orientation of the high-pressure gas tank must be changed so as to accord with the orientation of the jetting port, and there is the problem that the work is bothersome. The object of the high-pressure gas tank of Structure 1 is to solve this problem.

In the high-pressure gas tank of Structure 1, the communication path is formed at the concave portion of the fixed member, and the jetting port, which can communicate with the communication path through the gap, is formed at the ring at which the gap is formed between the ring and the outer surface of the fixed member. Due thereto, in the present disclosure, at the time when high-pressure gas is released, the high-pressure gas passes from the flow path, which is at the axially central side of the fixed member formed in a tubular shape, through the communication path, and passes through the gap, and is jetted-out from the jetting port that is formed in the ring.

Namely, in the present disclosure, due to the gap being provided between the ring and the outer surface of the fixed member, the high-pressure gas, which passes from the flow path at the axially central side of the fixed member through the communication path and is released, can pass through the gap and be jetted-out from the jetting port, even if the position of the jetting port formed in the ring and the position of the communication path formed in the fixed member do not face one another.

Here, the ring can move along the peripheral direction with respect to the fixed member. Namely, in the present disclosure, the position of the jetting port can be changed by rotating the ring along the peripheral direction of the fixed member, in association with the mounted position of the tank main body. Therefore, there is no need to change the orientation of the high-pressure gas tank so as to accord with the orientation of the jetting port, and the workability improves.

(Structure 2)

A high-pressure gas tank in which a nut, which fixes the ring to the fixed member, is provided further toward the outer side in the axial direction of the tank main body than the ring.

In the high-pressure gas tank of Structure 2, the nut is provided further toward the outer side, in the axial direction of the tank main body, than the ring, and the ring is fixed to the fixed member by this nut. By fixing the ring to the fixed member by the nut in this way, as compared with a case in which, for example, claws are raised and the ring is fastened and fixed to the fixed member, or the ring is fixed to the fixed member by welding, the ring can be fixed to the fixed member by a simple operation, and, after the ring is fixed to the fixed member, the position of the ring can be changed.

(Structure 3)

A high-pressure gas tank in which the gap is formed by an annular groove portion that is provided concavely in the inner surface of the ring.

In the high-pressure gas tank of Structure 3, the annular groove portion is provided concavely in the inner surface of the ring, and due thereto, a gap is provided between the ring and the outer surface of the fixed member. Namely, at the ring, the both sides of the groove portion along the axial direction of the ring can abut the outer surface of the fixed member. Therefore, in the state in which the ring abuts the outer surface of the fixed member, movement of the ring along the direction orthogonal to the axial direction of the fixed member is restricted, and, due thereto, positional offset of the axial center of the fixed member and the axial center of the ring can be suppressed.

The present disclosure is not limited to the above-described embodiment and can, of course, be implemented by being modified in various ways other than the above-described embodiment, within a scope that does not depart from the gist thereof

What is claimed is:

1. A high-pressure gas tank connection structure comprising:
a tank main body, the tank main body being formed in a tubular shape, a first opening tube portion that can communicate with an exterior to the tank main body being formed at at least an axial direction end portion of the tank main body, a tubular mouthpiece being mounted to the first opening tube portion, and a high-pressure gas filling an interior of the tank main body;
a tank side connector, the tank side connector being tubular, the tank side connector being disposed on an axis of the tank main body and being mounted to the mouthpiece, and a concave portion being formed along an axial direction of the tank main body, the concave portion being concave toward an inner side of the tank main body;
a connection side connector, the connection side connector being connected to a supply member, the high-pressure gas being supplied to the supply member, a convex portion that can be joined with the concave portion being formed at the connection side connector, a region between the connection side connector and the tank side connector being sealed, and the connection side connector being able to move along the axial direction of the tank main body with respect to the tank side connector; and
a valve body, the valve body being provided further toward a deep side along the axial direction of the tank main body than the tank side connector, the valve body being urged toward the connection side connector, and, in a case in which the valve body is pushed by a distal end of the convex portion in a state in which the convex portion is joined with the concave portion, the valve body being opened from a closed state, and communicating the interior of the tank main body with the exterior to the tank main body, wherein:
a sealing member is provided at an outer surface of the convex portion, the sealing member being configured to contact an inner surface of the concave portion and to seal a region between the convex portion and the concave portion,
the valve body is pushed and opened in a state in which the region between the convex portion and the concave portion is sealed by the sealing member,
an amount of movement of the connection side connector, at which a state in which the region between the connection side connector and the concave portion is sealed by the sealing member is maintained, is greater than an amount of movement of the connection side connector up until the closed valve body opens, and smaller than an amount of movement of the connection side connector from after the convex portion is joined to the concave portion up until a completely joined state in which the convex portion and the concave portion are completely joined, at the concave portion, a lateral hole portion that communicates with the exterior to the tank main body passes through in a direction orthogonal to the axial direction of the tank main body at a position that is further apart from the valve body than the sealing member, and a distance between the lateral hole portion and the sealing member along the axial direction of the tank main body in the completely joined state of the convex portion and the concave portion is greater than the amount of movement of the connection side connector up until the closed valve body opens, and smaller than the amount of movement of the connection side connector at which the state, in which the region between the connection side connector and the concave portion is sealed by the sealing member, is maintained.

2. The high-pressure gas tank connection structure of claim 1, wherein:

a second opening tube portion that can communicate with the exterior to the tank main body is provided at another axial direction end portion of the tank main body, and a thermally-actuated pressure relief device, which releases the high-pressure gas that is within the tank main body in a case in which a temperature that is greater than or equal to a predetermined temperature is sensed, is provided at the second opening tube portion.

3. The high-pressure gas tank connection structure of claim 2, further comprising:

a fixed member formed in a tubular shape and mounted to the other axial direction end portion side of the tank main body, and at which the thermally-actuated pressure relief device is mounted to another concave portion that is formed along the axial direction of the tank main body so as to be concave toward the inner side of the tank main body;

a communication path that, at the other concave portion, passes through along a direction orthogonal to an axial direction of the fixed member from an inner surface of the other concave portion over to an outer surface of the fixed member, and, in a case in which the high-pressure gas is released, the communication path communicates the interior of the tank main body with the exterior to the tank main body by a safety valve that is provided at the thermally-actuated pressure relief device;

a ring provided at the outer surface of the fixed member, a gap being formed between the ring and the outer surface of the fixed member and being able to communicate with the communication path, and the ring being able to move along a peripheral direction with respect to the fixed member and being unable to move along an axial direction with respect to the fixed member; and a jetting port formed at the ring and passing through from an inner surface over to an outer surface of the ring, and being able to communicate the communication path with the exterior to the tank main body through the gap.

4. The high-pressure gas tank connection structure of claim 3, wherein a nut, which fixes the ring to the fixed member, is provided further toward an outer side in the axial direction of the tank main body than the ring.

5. The high-pressure gas tank connection structure of claim 3, wherein the gap is formed by an annular groove portion that is provided concavely at the inner surface of the ring.

6. The high-pressure gas tank connection structure of claim 1, wherein a protector, which forms an air layer or a heat insulating layer between the protector and the tank main body, is provided at an outer side of the tank main body.

* * * * *